(12) United States Patent
James (10) Patent No.: US 9,371,138 B2
(45) Date of Patent: Jun. 21, 2016

(54) NACELLE

(75) Inventor: Norman John James, San Diego, CA (US)

(73) Assignee: ROHR, INC., Chula Vista, CA (US)

( * ) Notice: Subject to any disclaimer, the term of this patent is extended or adjusted under 35 U.S.C. 154(b) by 99 days.

(21) Appl. No.: 13/491,472

(22) Filed: Jun. 7, 2012

(65) Prior Publication Data

US 2013/0327886 A1 Dec. 12, 2013

(51) Int. Cl.
*B64D 29/02* (2006.01)

(52) U.S. Cl.
CPC ...................................... *B64D 29/02* (2013.01)

(58) Field of Classification Search
CPC .................................. B64D 29/00; B64C 7/02
USPC ................ 244/53 R, 53 B, 198, 199.1, 54, 55
See application file for complete search history.

(56) References Cited

U.S. PATENT DOCUMENTS

| | | | | |
|---|---|---|---|---|
| 3,797,785 A | * | 3/1974 | Baerresen et al. | .......... 244/53 R |
| 3,960,345 A | | 6/1976 | Lippert, Jr. | |
| 4,147,028 A | | 4/1979 | Rodgers | |
| 4,311,289 A | | 1/1982 | Finch | |
| 4,449,683 A | | 5/1984 | Gratzer et al. | |
| 4,466,587 A | | 8/1984 | Dusa et al. | |
| 4,786,016 A | * | 11/1988 | Presz et al. | ..................... 244/130 |
| 5,035,379 A | | 7/1991 | Hersen et al. | |
| 5,228,641 A | * | 7/1993 | Remlaoui | ................. 244/110 B |
| 5,863,014 A | | 1/1999 | Standish | |
| 6,340,135 B1 | | 1/2002 | Barton | |
| 6,966,524 B2 | | 11/2005 | Stuhr | |
| 7,090,165 B2 | | 8/2006 | Jones et al. | |
| 7,484,356 B1 | * | 2/2009 | Lair | ............................. 60/226.2 |
| 2007/0084964 A1 | * | 4/2007 | Sternberger | ................ 244/53 R |
| 2008/0010969 A1 | | 1/2008 | Hauer et al. | |
| 2008/0016844 A1 | * | 1/2008 | Shutrump | .................... 60/226.1 |
| 2010/0132332 A1 | | 6/2010 | Vauchel | |
| 2010/0148012 A1 | * | 6/2010 | McDonough et al. | ...... 244/53 B |
| 2010/0287910 A1 | | 11/2010 | Joret et al. | |
| 2013/0092755 A1 | * | 4/2013 | Aten et al. | ............... 239/265.33 |

OTHER PUBLICATIONS

International Search Report and Written Opinion dated Nov. 7, 2013 in Application No. PCT/US2013/044851.
International Preliminary Report on Patentability dated Apr. 30, 2014 in Application No. PCT/US2013/044851.

* cited by examiner

*Primary Examiner* — Christopher P Ellis
*Assistant Examiner* — Jessica Wong
(74) *Attorney, Agent, or Firm* — Snell & Wilmer, L.L.P.

(57) ABSTRACT

A nacelle configured to be coupled to an underside of a wing so as to form a clearance space therebetween includes at least a lip defining an inlet and a first cowling disposed aft of the lip. The first cowling has an outer surface with at least one concave region that is depressed relative to another region of the outer surface. In some aspects, the depressed region can be disposed on an inboard side of the wing, for example, on an upper surface of the first cowling facing a wing. The nacelle can include a second cowling disposed between the lip and the first cowling and the first cowling can translate in a longitudinal direction relative to the second cowling.

15 Claims, 8 Drawing Sheets

FIG. 7

NACELLE

BACKGROUND

1. Field

This application relates generally to engine nacelles.

2. Description of the Related Technology

A nacelle is a casing or housing that holds an engine and/or other equipment on an aircraft. Nacelles are often coupled to an underside of a wing, for example, by a pylon. At present, nacelles are typically made from multiple pieces or cowlings which meet at lines, seams, or junctures referred to as splits. Splits in the nacelle introduce perturbations to air passing over the nacelle and such perturbations can increase not only drag forces on the nacelle itself but also drag forces on adjacent and downstream surfaces of the aircraft. For example, splits may increase drag forces on the adjacent wing. Thus, providing a nacelle that minimizes drag forces on the aircraft remains a significant challenge in aeronautical engineering applications.

SUMMARY

The devices, systems, and methods of the present invention each have several aspects, no single one of which is solely responsible for its desirable attributes. Without limiting the scope of this invention as expressed by the claims which follow, its more prominent features will now be discussed briefly. After considering this discussion, and particularly after reading the section entitled "DETAILED DESCRIPTION OF THE PREFERRED EMBODIMENTS" one of ordinary skill in the art will appreciate how the features of this invention provide advantages as compared to existing nacelles.

One aspect of the present invention is a nacelle that has a longitudinal axis and is configured to be coupled to an underside of a wing. The nacelle includes a lip that defines an inlet and a first cowling. The first cowling is disposed aft of the lip and has an outer surface. A portion of the outer surface forms a depression that is recessed relative to an adjacent portion of the outer surface.

Another aspect is a nacelle that has a longitudinal axis and is configured to be coupled to an underside of a wing so as to form a clearance space therebetween. The nacelle includes a lip defining an inlet and a first cowling. The first cowling at least partially defines an outlet and has an outer surface. A contour of the outer surface taken in a plane that is perpendicular to the longitudinal axis has at least two points of inflection.

Another aspect is a nacelle that has a longitudinal axis and includes a lip defining an inlet and an outlet cowling. The outlet cowling at least partially defines an outlet and is configured to translate in a longitudinal direction relative to the lip between at least a first configuration and a second configuration. The outlet cowling has an upper surface which faces the underside of the wing. The upper surface includes a depression. The nacelle further includes a cascade that has at least a first portion disposed between the outlet cowling and the longitudinal axis when the outlet cowling is in the first configuration. The first portion of the cascade is exposed when the outlet cowling is in the second configuration. In this regard, the second configuration may be the reverse thrust configuration.

Further aspects, features and advantages of the present invention will become apparent from the detailed description that follows.

BRIEF DESCRIPTION OF THE DRAWINGS

These and other features, aspects, and advantages of the present invention will now be described in connection with embodiments of the present invention, in reference to the accompanying drawings. The illustrated embodiments, however, are merely examples and are not intended to limit the invention. The various features illustrated in the drawings may not be drawn to scale. Accordingly, the dimensions of the various features may be arbitrarily expanded or reduced for clarity. In addition, some of the drawings may be simplified for clarity. Thus, the drawings may not depict all of the components of a given apparatus, device, system, method, or any other illustrated component or process.

DETAILED DESCRIPTION OF THE PREFERRED EMBODIMENTS

The following detailed description is directed to certain specific embodiments of the invention. However, the invention can be embodied in a multitude of different ways as defined and covered by the claims. In this description, reference is made to the drawings wherein like parts are designated with like numerals throughout.

Some embodiments of the invention disclosed herein relate to nacelles having outer surfaces with one or more portions, regions, surfaces, and/or areas that are depressed, recessed, or lowered relative to adjacent portions of the outer surface. That is to say, embodiments of nacelles disclosed herein can include one or more depressions, recesses, grooves, channels, and/or indentations formed in an outer surface of the nacelle. For example, a contour of the outer surface in a plane perpendicular to the longitudinal axis of the nacelle can have a plurality of inflection points which define at least a portion of the depression or depressed portion. Such inflection points can be points on the contour where the curvature or concavity of the outer surface of the nacelle changes sign or points on the contour where a tangent crosses the contour. For example, regions of the outer surface outside of the depressed portion can have a positive or upward curvature while the depressed portion can have a negative concave or downward curvature taken in a transverse section. An inflection point is defined as the location where the curvature changes between positive and negative. In some embodiments, the depressed portions are positioned on an inboard surface of the nacelle relative to the wing of the aircraft. In this way, nacelles disclosed herein can have a non-circular and asymmetrical longitudinal profile.

Depressed portions or depressions at one or more locations on the outer surface of the nacelle may advantageously reduce drag forces on a corresponding aircraft by providing a smoother air flow passage underneath an associated wing. It may be advantageous to position the depressed portions or depressions in a critical surface region of the nacelle where air flow between the nacelle and an associated wing is compressed against the leading edge of the wing. This compression of the air flow can increase drag forces on the wing. The depressed portions or depressions provide additional clearance between the depression and the wing for the flow of air. This additional clearance results in the air being less compressed and lowers air velocity. In some embodiments, the nacelle includes one or more depressions located in a transverse section of the outer surface of the nacelle. Of course the location(s) of the one or more depressions is not limited to the transverse section and may be located at any location on the outer surface of the nacelle.

The perimeter of the depression forms one or more transitions with the adjacent outer surfaces of the nacelle. In some embodiments, one or more of these transitions forms a smooth contour with the adjacent outer surface of the nacelle. For example, a smooth contour can include a region that is concave, convex, and/or tapers between the depression and the adjacent outer surface. Of course the transitions need not be smooth and can include steps or other surface features.

A critical surface region of the nacelle is on an inboard side of the nacelle that is in close proximity to the wing. Locating one or more depressions in this critical surface region improves axial air flow by maintaining a smooth continuity as the air passes over the depression or depressed zone. In some embodiments, the slope of the depression progressively increases to the most depressed point of the depression. This slope can be selected to maintain the smooth continuity in axial air flow without causing flow separation. Thus, nacelles disclosed herein can advantageously have outer surface profiles that result in less drag on a corresponding aircraft than existing aircraft nacelles. Hence, the nacelles disclosed herein can provide several advantages over existing nacelles.

Figure 1:
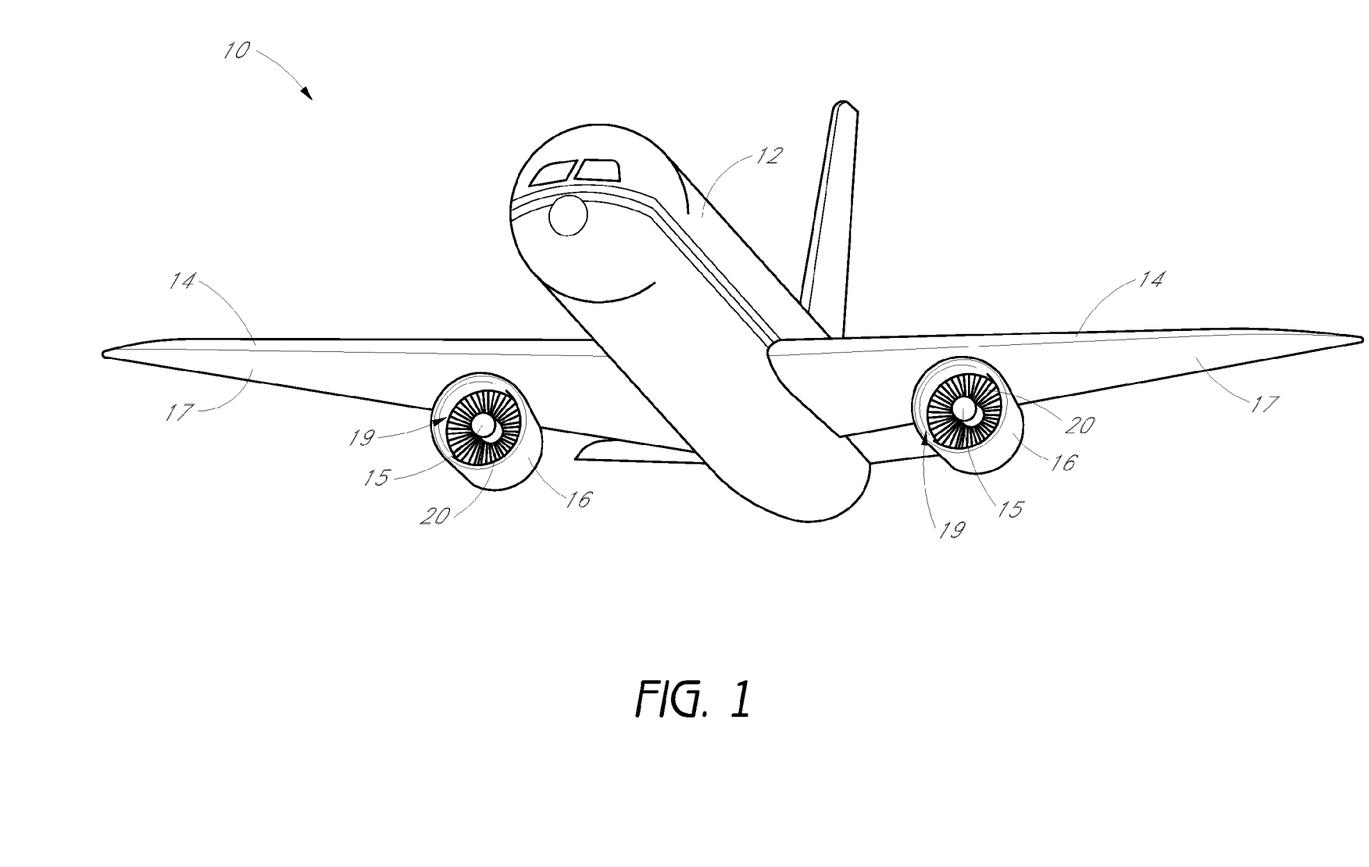
FIG. 1 is a perspective view of an aircraft including a pair of nacelles located on the undersides of the wings.

FIG. 1 is a perspective view of an aircraft 10 having a fuselage 12 and a pair of wings 14 extending laterally from the fuselage 12. A nacelle 16 is coupled to an underside 17 of each wing 14. Although not illustrated in FIG. 1, in some embodiments, each nacelle 16 is coupled to a wing 14 by a pylon, or any other suitable structure capable of coupling a load to a wing.

Each nacelle 16 houses an aircraft engine 15, for example, a high bypass ratio engine. A high bypass ratio engine 15 receives air through a fan 20 disposed near an inlet 19 of the nacelle 16, combusts the received air with fuel within a combustion chamber, and provides an exhaust jet through a rear-facing nozzle or outlet to propel the aircraft 10 in a forward direction. Additionally, high bypass ratio engines also receive a substantial amount of air through the inlet 19 of the nacelle 16 that is passed over, or that bypasses, the engine 15 to provide additional thrust. The bypass air is combined with the exhaust jet and improves fuel efficiency and engine noise. In some embodiments, the nacelle 16 can include a variable area fan nozzle cowling configured to vary an outlet area through which the exhaust jet and bypass air can pass through. A high bypass ratio engine 15 requires a substantial amount of clearance between an exterior surface of the engine 15 and the interior surface of the nacelle 16 to accommodate the additional bypass air. This added clearance increases the overall size of the nacelle 16 which may reduce the clearances between the nacelle 16, the wing, 14, and landing surface. One way to adjust for the increase in size of the nacelle 16 and still maintain the necessary clearance between the nacelle and the landing surface is to shorten the pylon and shift the nacelle 16 closer to the underside 17 of the wing 14. However, this solution also moves the air flowing across the top surface of the nacelle 16 closer to the underside 17 of the wing 14 and may exacerbate the impact of perturbations or other flow effects on the underside 17 of the wing 14.

Still referring to FIG. 1, during flight, air flows through the inlet 19 of each nacelle 16 as well as over the outer surfaces of each nacelle 16. The outer surfaces of the nacelle 16 may be formed by various cowlings that are joined together to form the nacelle 16. Surface irregularities on the outside of each cowling component can disrupt air flowing over the nacelle 16 and lead to downstream drag as these disruptions may interact with other surfaces of the aircraft 10. For example, a flow of air over a nacelle 16 may be disturbed by an external split or juncture between two or more cowlings or components of the nacelle 16. The resulting disruption may increase drag on the underside 17 of an associated wing 14. Air flow disruptions resulting from the outer surfaces of a nacelle 16 may be particularly problematic when the nacelle 16 is disposed relatively near to the underside 17 of the wing 14 (e.g., in high bypass ratio engine aircrafts).

Further, even without air flow disruptions caused by irregularities (e.g., splits or junctures) on an outer surface of a nacelle 16, the profile of the nacelle 16 can affect the amount of drag on the aircraft 10. For example, the space between the nacelle 16 and the underside 17 of the wing 14 can be sized and shaped such that turbulent air flow occurs therebetween. That is to say, in some embodiments, the shape of the top cowling of the nacelle 16 may impede laminar flow between the nacelle 16 and the wing 14.

As discussed above, the aircraft 10 may be exposed to drag forces when air that passes between the nacelle 16 and the underside 17 of an associated wing 14 is compressed between the wing 14 and the nacelle 16. Accordingly, embodiments of nacelles disclosed herein can include one or more depressed regions or depressions formed in an outer surface of the nacelle 16 to decrease drag forces on the associated wing 14 which may improve fuel efficiency. In some embodiments, such depressed regions or depressions can allow for an aircraft 10 to be manufactured and/or retrofitted to incorporate a larger engine 15 and nacelle 16 without reducing the clearance dimension between the aircraft's wings 14 and the landing surface. For example, a nacelle 16 with one or more depressed regions or depressions formed in an outer surface of the nacelle 16 may provide for an acceptable clearance space between a critical surface region of the nacelle 16 and an associated wing 14 without requiring the longitudinal axis of the nacelle 16 to be further distanced or offset from the wing 14. Thus, there may be no need to adjust the height of the aircraft's landing gear or fuselage to account for a larger engine 15 because the engine 15 is positioned closer to the wing 14 while maintaining an acceptable clearance space between the critical surface region of the nacelle 16 and an associated wing 14.

To assist in the description of the nacelles 16 described below with reference to the figures, the following coordinate terms are used, consistent with the coordinate axes illustrated. A "longitudinal axis" is generally parallel to an axis of the nacelle that extends between the inlet 19 and outlet of the nacelle. A "lateral axis" is normal to the longitudinal axis and is generally parallel to a wing 14 associated with the nacelle. A "transverse axis" extends normal to both the longitudinal and lateral axes. In addition, as used herein, "the longitudinal direction" refers to a direction substantially parallel to the longitudinal axis; "the lateral direction" refers to a direction substantially parallel to the lateral axis; and "the transverse direction" refers to a direction substantially parallel to the transverse axis.

The terms "upper," "lower," "top," "bottom," "underside," "upperside" and the like, which may be used to describe nacelles and related components in the discussion below, are used in reference to the illustrated orientation of the embodiments. For example, the term "upperside" is used to describe the portion of a nacelle that is disposed above an engine 15 housed within the nacelle. The term "underside" is used to describe the portion of the nacelle that is located below a plane that passes through the longitudinal axis of the nacelle or the portion of a wing that faces an associate nacelle. Additionally, the adverbs or adjectives "aft" and "fore" are used with reference to the rear and front sides of a nacelle, respectively. For example, the term "aft" means toward the rear or outlet of a nacelle and the term "fore" means towards the front or inlet of a nacelle. The terms "inboard" and "outboard" are used with reference to an airframe or fuselage ultimately coupled to the nacelle. For example, an "inboard" surface of a nacelle may face toward an airframe or fuselage when the nacelle is coupled to the airframe while an "outboard" surface of the nacelle may face away from the airframe or fuselage. In this way, an "inboard" side of a nacelle may be disposed between the "outboard" side of the nacelle and the fuselage when the nacelle is coupled indirectly to the fuselage, for example, via a wing.

Figure 2A:
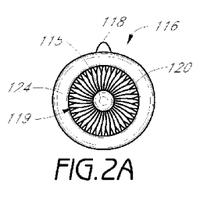
FIG. 2A is a front view of a nacelle according to a preferred embodiment.

FIGS. 2A-2E illustrate an embodiment of a nacelle 116. FIG. 2A schematically depicts a front view of the nacelle 116 and an engine 115 housed therein. The engine 115 is coupled with a fan 120 that is disposed near the front side of the nacelle 116 to draw air into the nacelle 116 through an inlet 119. As described in further detail below, the air drawn in through the inlet 119 may be expelled through an outlet 131 of the nacelle 116 and/or combusted with fuel to provide a forward thrust for the aircraft. At certain times during aircraft operation, air is expelled through a thrust reverser arrangement to produce a backwards (e.g., reverse) thrust.

The nacelle 116 is coupled to the aircraft by a pylon 118 disposed on the upperside of the nacelle 116. For example, the nacelle 116 can be coupled to the underside of an aircraft wing 117 as shown in FIGS. 2B and 2C such that the engine 115 selectively provides forward and reverse thrust capabilities to the aircraft.

Still referring to FIGS. 2A-2E, the nacelle 116 has an inlet lip or noselip 124. An inlet cowling 126 and a top cowling 128 are disposed aft of the inlet lip 124. As illustrated, the inlet lip 124 can be substantially ring-shaped to define the inlet 119 of the nacelle. Additionally, as discussed below, the inlet lip 124 can have an irregular shape such that a distance between a first outer portion (e.g., the top side) of the inlet lip 124 and a longitudinal axis 177 of the nacelle 116 is different than a distance between a second outer portion (e.g., the bottom side) of the inlet lip 124 and the longitudinal axis 177 of the nacelle 116.

In some embodiments, the inlet cowling 126 defines a C-shaped portion that forms a channel with the top cowling 128 through the nacelle 116. For example, the top cowling 128 can span between 10° and 180° of the circumference of the nacelle 116, or more, and the inlet cowling 126 can span the remaining portion of the circumference of the nacelle 116 so as to form a channel that receives air passing through the inlet 119 and the inlet lip 124. In some embodiments, the top cowling 128 spans between about 20° and about 90° of the circumference of the nacelle 116 and the inlet cowling 126 spans the remaining portion of the nacelle 116.

Figure 2B:
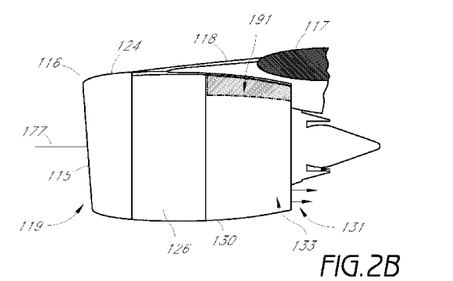
FIG. 2B is a side view of the nacelle of FIG. 2A relative to a wing.
Figure 2C:
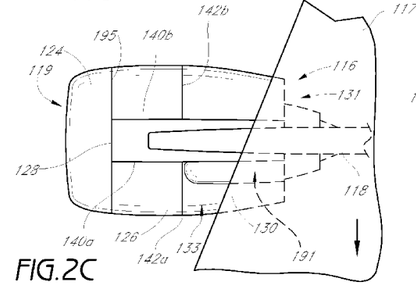
FIG. 2C is a top view of the nacelle of FIG. 2A relative to a wing.

FIGS. 2B and 2C illustrate a side view and a top view, respectively, of the nacelle 116. As can be seen in these figures, the nacelle 116 includes an outlet cowling 130 disposed adjacent to, and aft of the inlet cowling 126. Transverse splits 142a, 142b are disposed between the inlet cowling 126 and the outlet cowling 130. A transverse split 195 is also disposed between the inlet lip 124 and the top cowling 128 and the inlet cowling 126. Additionally, the nacelle 116 includes a pair of longitudinally extending splits 140a, 140b disposed between the top cowling 128 and the inlet and outlet cowlings 126, 130. In other words, the longitudinally extending splits 140a, 140b extend from the inlet lip 124 to the outlet 131.

As discussed above, air that passes or flows between the nacelle 116 and the underside of the wing 117 can be compressed between the wing 117 and the nacelle 116. In some implementations, such compression occurs, for example, in a critical surface region localized between the wing 117 and the inboard side of the upper surface of the nacelle 116. In some embodiments, such compression can result in drag forces on the wing 117. However, as shown in FIGS. 2B, 2C, and 2E, an outer surface 133 of the outlet cowling 130 can include a depressed region or depression 191. This depressed region or depression 191 can be formed near and/or in the critical surface region of the inboard side of the upper surface of the nacelle 116. As shown in FIG. 2E, the depression 191 can be recessed or inset relative to an adjacent portion of the outer surface 133 of the outlet cowling 130. As shown in FIG. 2C, the swept wing 117 is in closer proximity to the outlet cowling 130 on the inboard side as a function of its sweep angle relative to the longitudinal axis of the nacelle. As a result, air flow between the wing and the critical surface region on the inboard side of the nacelle is more likely to be compressed.

As shown in FIG. 2C, an aft portion of the depression 191 is juxtaposed to the underside of the wing 117. Thus, the depression 191 can be sized and shaped to move the critical surface region of the nacelle 116 away from the wing 117. Stated differently, the depression 191 increases the distance between the critical surface region of the nacelle 116 and the underside of the wing 117. As mentioned above, the critical surface region of the nacelle 116 can be located on an inboard side of the nacelle 116 in closest proximity to the wing 117 as shown by the bounded area of the depression 191 of FIG. 2B. This increase in distance between the critical surface region of the nacelle 116 and the underside of the wing 117 reduces drag forces on the wing 117 that would result from the compression of the air flow between the depression 191 and the wing 117 if the critical surface region was closer to the wing 117. In this way, the depressed region or depression 191 can advantageously reduce drag on, and improve fuel efficiency of, the associated aircraft.

Figure 2D:
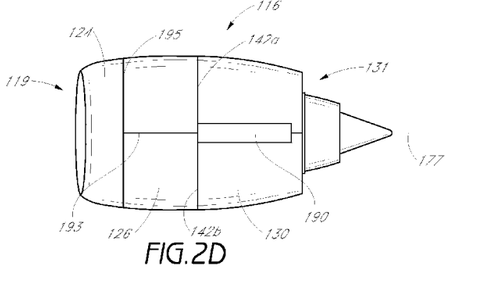
FIG. 2D is a bottom view of the nacelle of FIG. 2A.
Figure 2E:
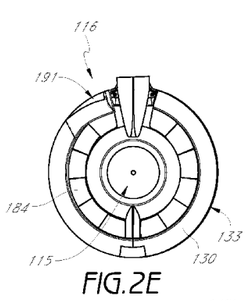
FIG. 2E is a rear view of the nacelle of FIG. 2A.

As shown in FIG. 2D, in some embodiments the nacelle 116 can include a longitudinally extending split 193 extending from the inlet lip 124 to the outlet cowling 130 along the bottom side of the nacelle 116. In some embodiments, the inlet cowling 126 can include complementary halves that may rotate relative to the top cowling 128 to provide access to internal components within the nacelle 116. Further, the bottom side of the outlet cowling 130 can include a panel 190 which joins complementary halves of the outlet cowling 130. Thus, when coupled together by the panel 190, the halves of the outlet cowling 130 can translate longitudinally relative to the inlet cowling 126 together.

As shown in FIGS. 2B and 2C, the top cowling 128 can be structurally integrated with the pylon 118 such that the inlet and/or outlet cowlings 126, 130 can translate or otherwise move relative to the top cowling 128 and pylon 118. In some embodiments, the top cowling 128 and the pylon 118 are integrally formed such that there are no splits formed therebetween. For example, the top cowling 128 and the pylon 118 may be formed from a single homogeneous piece of material. In other embodiments, the top cowling 128 and the pylon 118 may be separate structures that are permanently affixed to one another. For example, the top cowling 128 and the pylon 118 may be inseparable without damaging at least one of the top cowling 128 and the pylon 118. In such embodiments, one or more fairings or other aerodynamic structures may be incorporated between the top cowling 128 and the pylon 118 to improve the aerodynamic characteristics at their interface.

As shown in FIG. 2E, an outer longitudinal profile of the nacelle 116 can be asymmetric. For example, the nacelle 116 may include a single depression 191 formed on an inboard side of the outer surface 133 of the outlet cowling 130. That is to say, the outboard side of the outlet cowling 130 may not include a depression or depressed region 191. Further, the nacelle 116 can include blocker doors 184 that are activated to impede (e.g., to prevent, inhibit, or reduce) the flow of air that bypasses the engine 115 and prevents such air from passing through the outlet 131 of the nacelle 116 when the nacelle 116 is in a reverse thrust configuration. As shown, the nacelle 116 can allow for the passage of bypass air between the depression 191 and the engine 115 when the blocker doors are activated to allow additional leakage to compensate for the loss of efflux area through the depression 191 as discussed below with reference to FIG. 7. In other words, in may be advantageous to not include a blocker door 184 at the circumferential location of the depression 191 so as to not redirect the bypass air and instead allow the bypass air to continue through the nacelle 116 and exit from the outlet 131 when the nacelle 116 is in the reverse thrust configuration. In this way, the duct pressure within the nacelle 116 is balanced when in the reverse thrust configuration. In some embodiments, in order to facilitate a sufficient reduction or lowering of the outer surface 133 in the critical surface region bounded by the depression 191 for aero drag purposes, the nacelle 116 can include a blank cascade or solid plate that inhibits efflux exit during thrust reverse disposed between the longitudinal axis and the depression 191.

Figure 3:
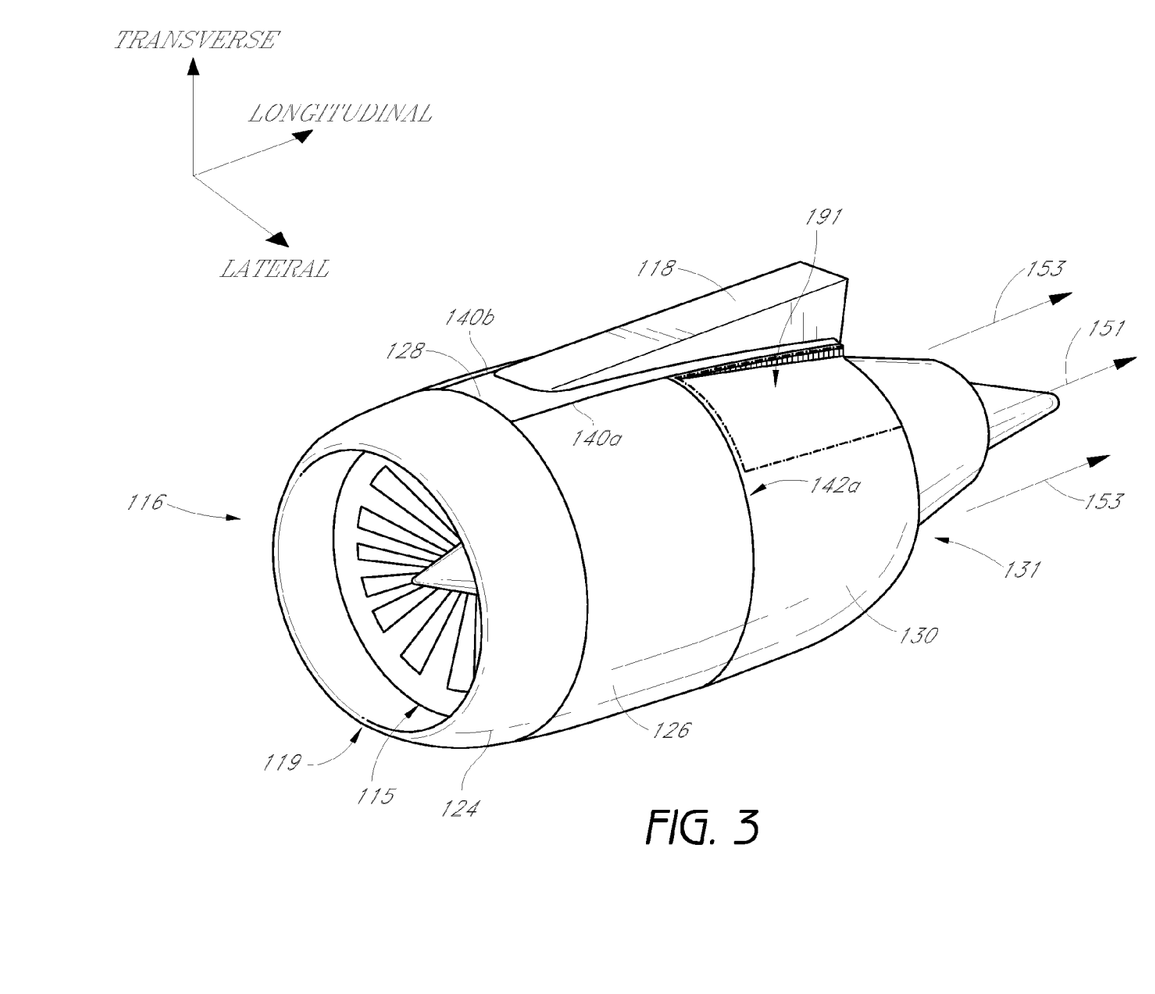
FIG. 3 is a perspective view of the nacelle of FIGS. 2A-2E in a forward thrust configuration.

FIG. 3 is a perspective view of the nacelle 116 and engine 115 of FIGS. 2A-2E in a forward thrust configuration. As shown in FIG. 3, when in the forward thrust configuration, the outlet 131 of the nacelle 116 is substantially unimpeded by blocker doors 184 such that the engine exhaust 151 and bypass air 153 exit the nacelle 116 through an air pathway or duct defined between the inlet 119 and outlet 131 of the nacelle.

Figure 4:
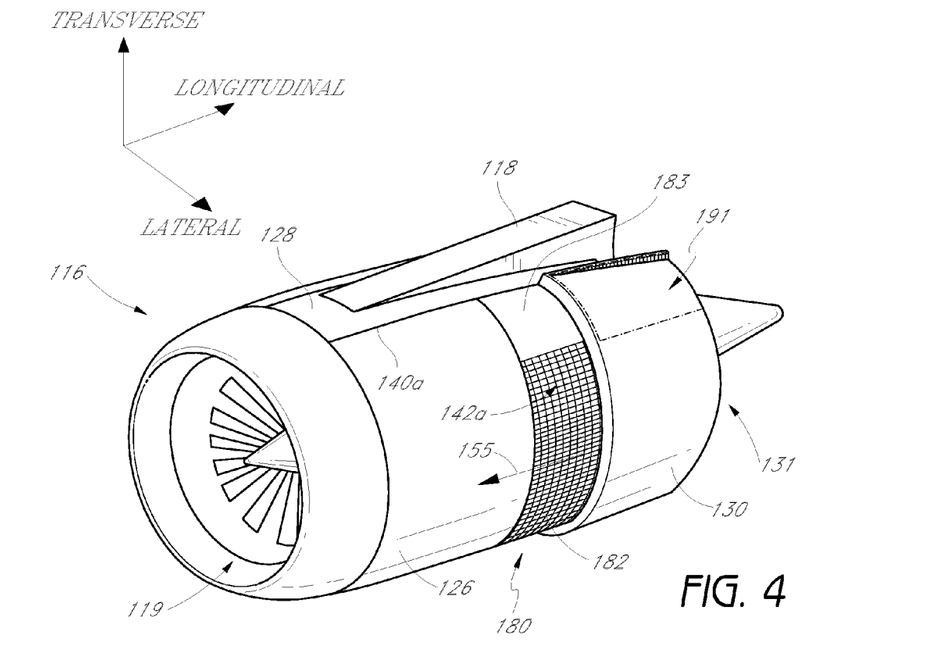
FIG. 4 is a perspective view of the nacelle of FIGS. 2A-2E in a reverse thrust configuration.
Figure 5:
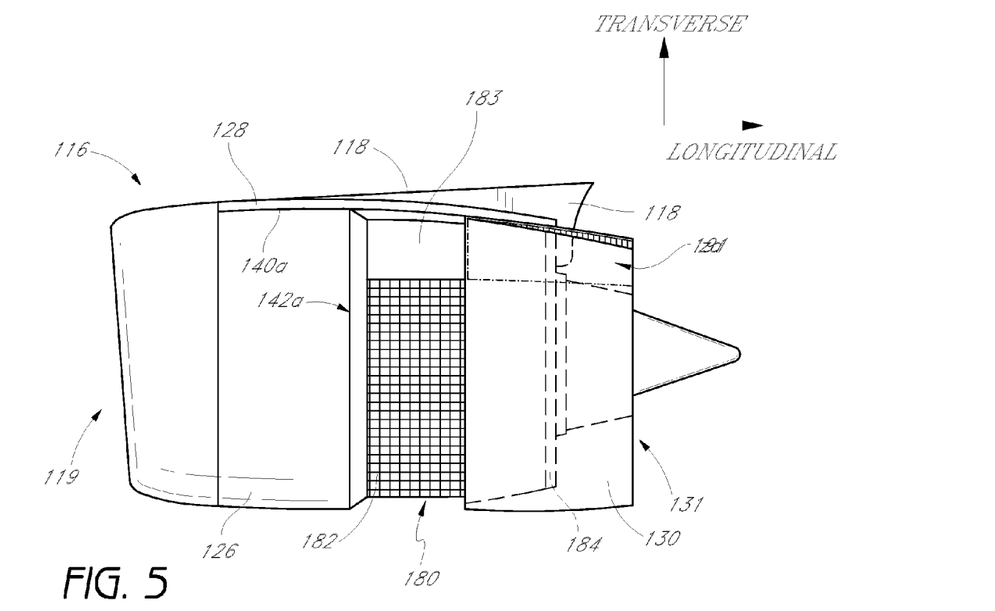
FIG. 5 is a side view of the nacelle of FIG. 4.

FIGS. 4 and 5 show the nacelle 116 of FIGS. 2A-2E in a reverse thrust configuration. In the reverse thrust configuration, the outlet cowling 130 is translated longitudinally away from the inlet cowling 126 as compared with the position of the outlet cowling 130 illustrated in FIG. 3 (e.g., as compared with the position of the outlet cowling 130 in the forward thrust configuration). In some embodiments, the longitudinal translation of the outlet cowling 130 is guided along the longitudinal splits 140a, 140b between the outlet cowling 130 and the top cowling 128 by one or more engaging structures, for example, hinge beam tracks (above) and latch beam tracks (below). Such longitudinal translation of the outlet cowling 130 acts to expand the transverse splits 142a, 142b disposed between the inlet cowling 126 and the outlet cowling 130 and exposes an underlying cascade 180. As discussed below with reference to FIG. 6C, the cascade 180b can include a first portion 182b and a second portion 183b. The first portion 182b can include a plurality of vanes disposed circumferentially about the longitudinal axis of the nacelle 116. The vanes redirect a flow of air from within the nacelle 116 through a cascade to produce a reverse thrust.

In some embodiments, the first portion 182 of the cascade 180 is disposed between the outlet cowling 130 and the longitudinal axis of the nacelle 116. That is to say, the first portion 182 can be disposed radially inward of the outlet cowling 130, but it does not extend in the circumferential direction beneath the depression 191 (i.e., it is not radially inward of the depression 191). In some embodiments, the second portion 183 of the cascade 180 is disposed between the depression 191 and the longitudinal axis of the nacelle. In such embodiments, a reverse thrust may not pass through the second portion 183 of the cascade 180 but the second portion 183 may be disposed radially inward of the depression 191 for load path or structural integrity purposes. Further, in such embodiments, the second portion 183 disposed radially inward of the depression 191 may not redirect bypass flow but flat "blank" cascades (with a low profile) are inserted instead of vaned cascades to carry hoop loads directly to an associated pylon 118.

Figure 6A:
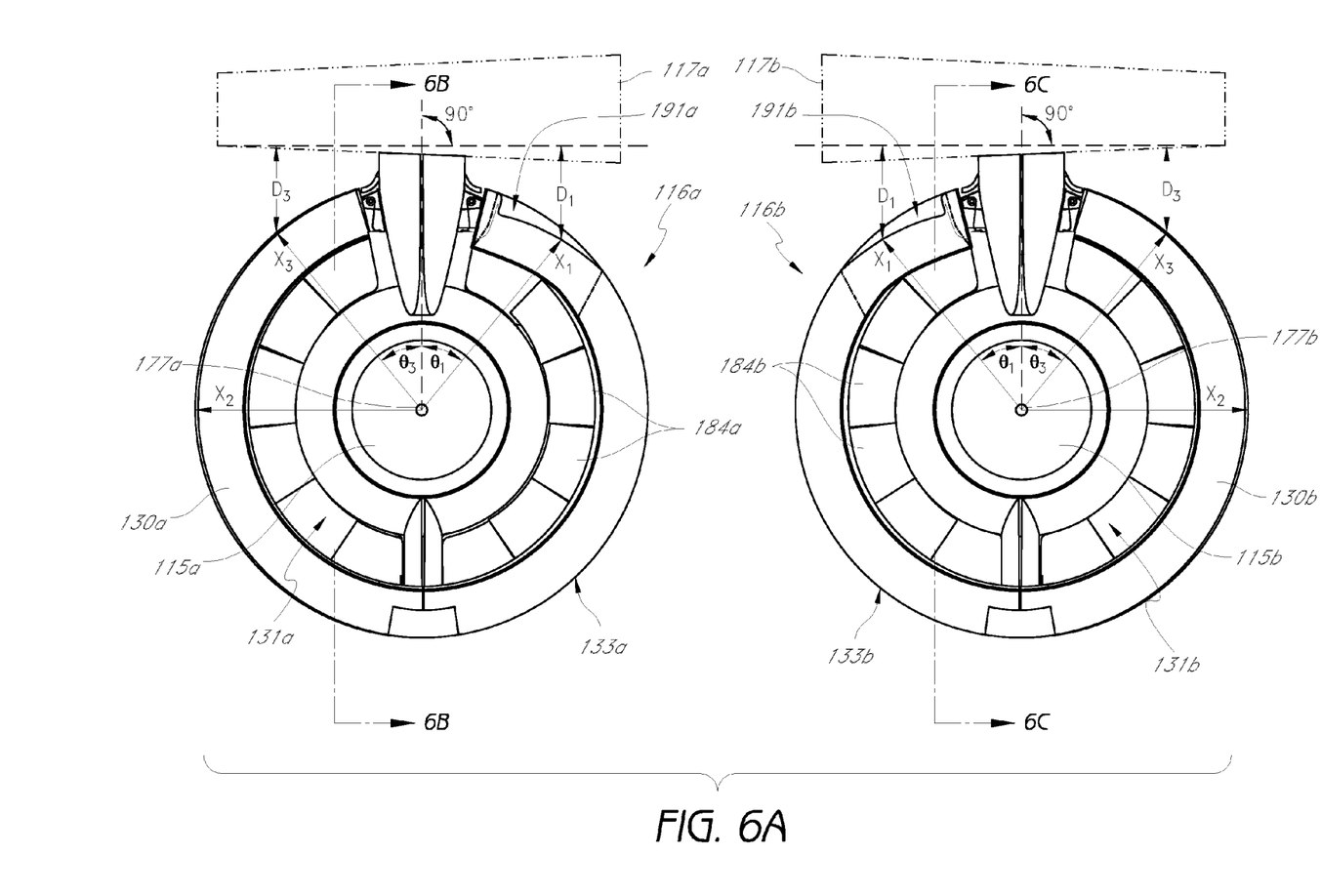
FIG. 6A shows a pair of nacelles with each nacelle disposed relative to a wing of an aircraft.

Turning now to FIG. 6A, a pair of nacelles 116a, 116b are schematically illustrated representing left and right hand nacelle installations with reference to a pair of wings 117a, 117b. As illustrated, each nacelle 116 includes a depression 191 formed in an inboard side of the outer surface 133 of the nacelle 116 in the region of the outlet 131. In some embodiments, the depressions 191a, 191b is formed in an upper side of the nacelles 116a, 116a such that a flow of air between the inboard side of the nacelles 116a, 116b and the wings 117a, 117b has a lower velocity and resultant drag effect than without the depressions 191a, 191b. In this way, the profile of the nacelles 116a, 116b along the longitudinal axes 177a, 177b is asymmetric as shown. For example, the relative distance $D_3$ in that view, between the outboard side of the upper surfaces of the nacelles 116a, 116b and the wings 117a, 117b is less than a clearance space $D_1$ between the inboard side of the upper surfaces of the nacelles 116a, 116b and the wings 117a, 117b because the depressions 191a, 191b lower the outer surfaces 133a, 133b of the nacelles 116a, 116b relative to the wings 117a, 117b. In other words, the distance between the nacelle outer surface 133 and the wing 117 in the area of the depression 191 (see distance $D_1$ in FIG. 6A) is greater than the distance between the nacelle outer surface 133 and the wing 117 in the area away from the depression 191 (see $D_3$ in FIG. 6A, where $\theta_1=\theta_3$). Additionally, and because of the depression 191, distance $X_1$ is less than distance $X_3$. Thus, the distance $X_1$ between the longitudinal axis 177 of the nacelle 116 and the depression 191 is less than the distance $X_3$ between an outboard side of the upper surface of the nacelle 116 and the longitudinal axis 177.

In some embodiments, the nacelle outer surface 133 has an irregular shape in regions outside the depression 191. For example, the distance $X_2$ between the longitudinal axis 177 and a lateral side of the outer surface 133 can be different than the distance $X_3$. In this way, the nacelles 116a, 116b can have a plurality of different radii of curvature measured in a plane perpendicular to the longitudinal axis 177.

Figure 6B:
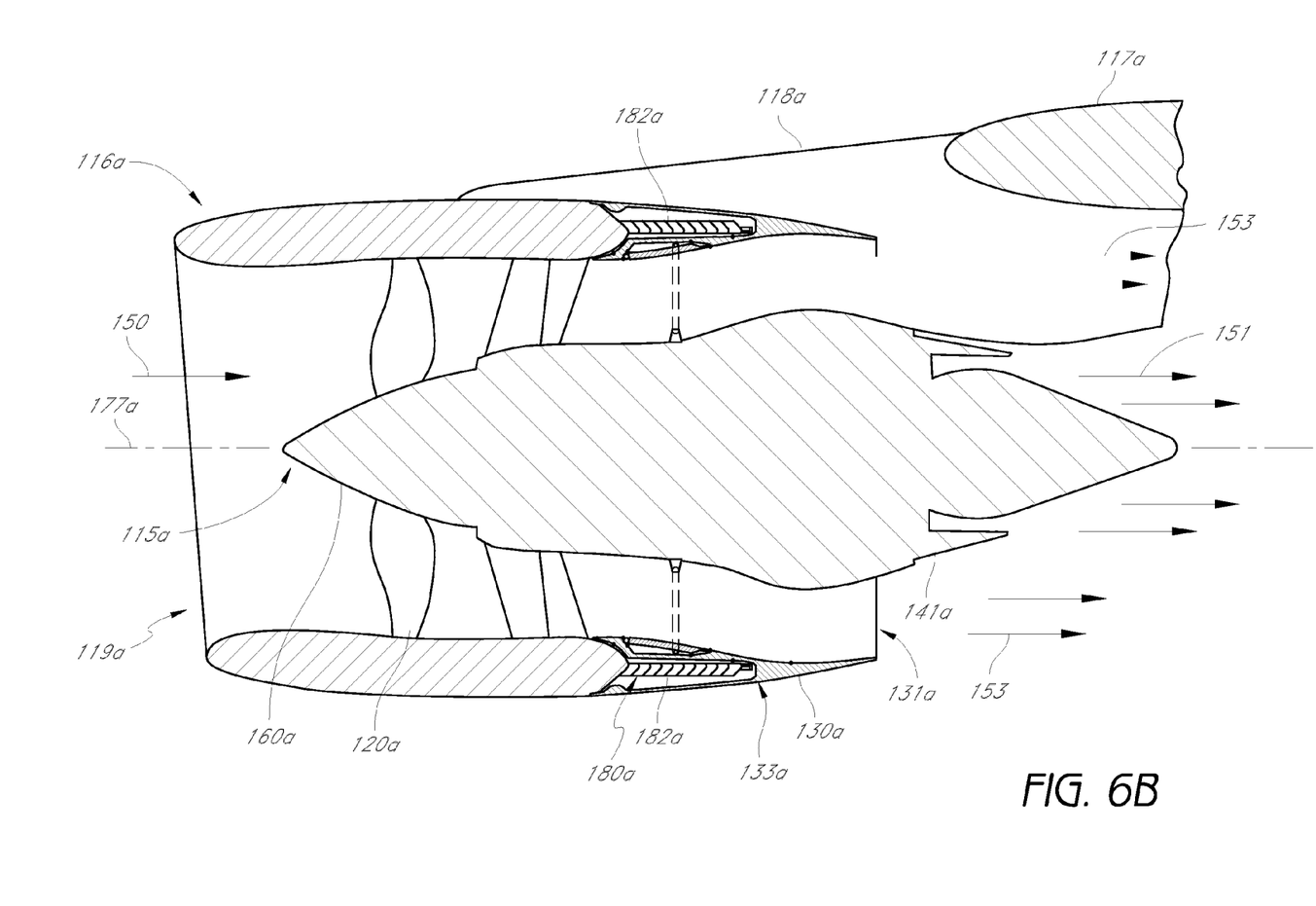
FIG. 6B is a cross-sectional view through one of the nacelles of FIG. 6A taken along line 6B-6B.

FIG. 6B shows a cross-sectional view of the nacelle 116a and engine 115a of FIG. 6A taken along line 6B-6B (outboard of the pylon). As shown, the engine 115a extends longitudinally and includes an exhaust nozzle 141a that extends from the outlet 131a of the nacelle 116a. As schematically illustrated, a fan 120a draws incoming air 150 into the nacelle 116a through inlet 119a. A portion of the incoming air 150 enters the engine 115a while another portion 153 of the drawn in air 150 bypasses the engine 115a and passes over engine cowling 160a. Thus, bypass air 153 exits the outlet 131a along with a flow of engine exhaust 151 to provide a forward thrust relative to the nacelle 116a (e.g., to provide a force that thrusts the nacelle and aircraft from right to left as illustrated in FIG. 6B).

Although FIG. 6B illustrates the nacelle 116a in a forward thrust configuration, as discussed above, the outlet cowling 130a may be translated aft relative to the inlet 119a into a reverse thrust configuration. When in the reverse thrust configuration the bypass air 153 is exposed to the first portion 182a of the cascade structure 180a. The first portion 182a of the cascade structure 180a can include a plurality of vanes disposed around the longitudinal axis 177a of the nacelle 116a.

When the outlet cowling 130a is in the reverse thrust configuration, the vanes direct the bypass air 153 away from the nacelle 116a and toward the inlet 119a to provide a reverse thrust relative to the nacelle 116a (e.g., to provide a force that thrusts the nacelle and aircraft from left to right as illustrated in FIG. 6B). In some embodiments, blocker doors may at least partially impede the flow of air through the outlet 131a such that the bypass air 153 is forced through the first portion 182a of the cascade structure 180a.

Figure 6C:
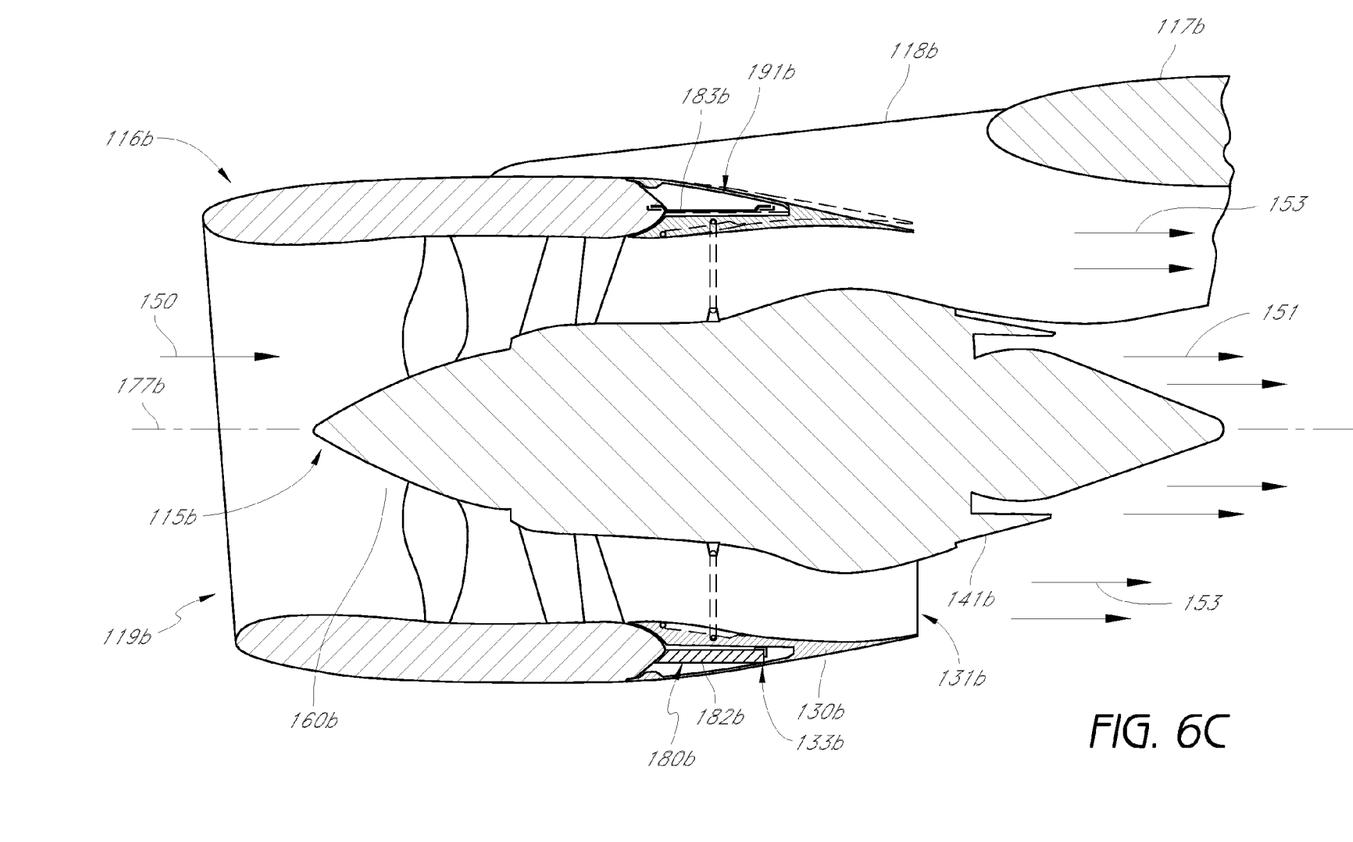
FIG. 6C is a cross-sectional view through a depressed region or depression in an outer surface of the nacelle of FIG. 6A taken along line 6C-6C.

FIG. 6C is a cross-sectional view through a depressed region or depression 191b in the outer surface 133b of the nacelle 116b of FIG. 6A taken along line 6C-6C (inboard of the pylon). As shown, the cascade structure 180b of the nacelle 116b includes the first portion 182b disposed between the bottom side of the outlet cowling 130b and the longitudinal axis 177b. The cascade structure 180b of the nacelle 116b also includes the second portion 183b disposed between the depression 191b and the longitudinal axis 177b. The second portion 183b of the cascade structure 180b can include a "blank" cascade.

In some embodiments, a maximum transverse dimension of the second portion 183b of the cascade structure 180b may be limited by the transverse dimension of the depression 191b. That is to say, because the depression 191b locally depresses or lowers the outer surface 133b of the nacelle 116b toward the longitudinal axis 177b, less room is available for the cascade structure 180b underneath the depression 191b. Accordingly, as mentioned above, in some embodiments, the second portion 183b of the cascade structure 180b can include fewer vanes than the first portion 182b of the cascade structure 180b or no vanes at all. As a result, the second portion 183b of the cascade structure 180b may not contribute to a reverse thrust when the nacelle 116b is in the reverse thrust configuration because the bypass air 153 may not pass through the second portion 183b of the cascade structure 180b. However, the second portion 183b of the cascade structure 180b can be configured to provide hoop continuity about the longitudinal axis 177b of the nacelle 116b to structurally balance the nacelle 116b. Of course, those having ordinary skill in the art will appreciate that the second portion 183b of the cascade structure 180b is optional. Thus, in some embodiments there is no cascade structure 180b disposed below the depression 191b other than that required to maintain structural hoop continuity. In any case, as discussed below, the loss of efflux exit area for the bypass air 153 through the cascade structure 180b when the nacelle 116b is in the reverse thrust configuration can be offset by the elimination of one or more blocker doors in the area of the depression 191b to achieve a balance of the duct pressure within the nacelle 116b.

Figure 7:
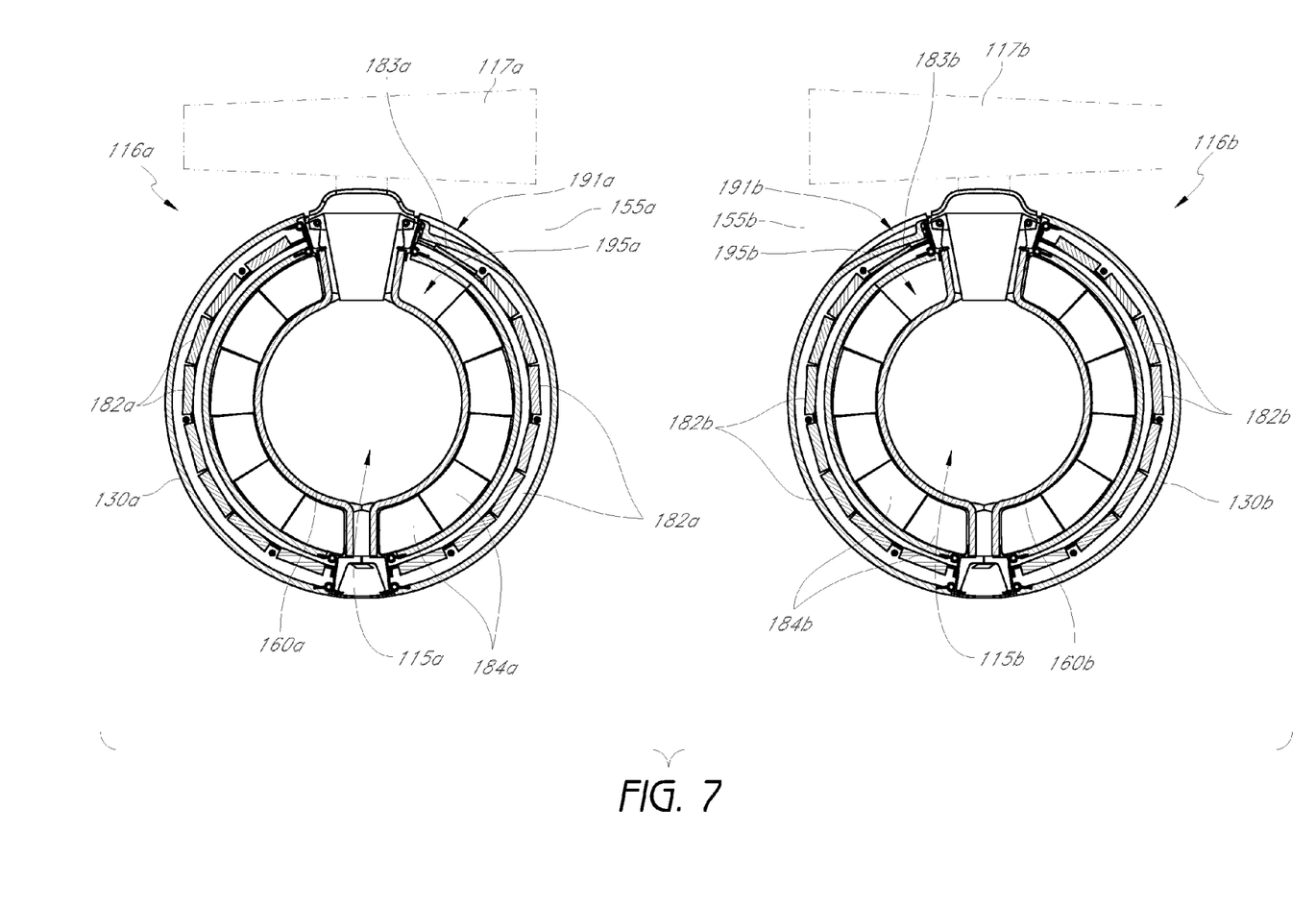
FIG. 7 shows a cross-sectional view through the pair of nacelles of FIG. 6A with each nacelle in a reverse thrust configuration.

FIG. 7 shows a cross-sectional view through the pair of nacelles 116a, 116b of FIG. 6A with each nacelle in a reverse thrust configuration as is illustrated in FIGS. 4 and 5. As shown, the nacelles 116a, 116b include a plurality of blocker doors 184a, 184b that are activated to impede (e.g., to prevent, inhibit, or reduce) at least some of the air that bypasses the engine 115a, 115b and prevent such air from passing through the outlet of the nacelle 116a, 116b when the nacelle is in a reverse thrust configuration. In this way, the blocker doors 184a, 184b redirect air 155a, 155b through the first portion 182a, 182b of the cascade structure and the vanes of the first portion 182a, 182b redirect the air 155a, 155b to produce a reverse thrust.

As mentioned above, in some embodiments, a second portion 183a, 183b of the cascade structure may be disposed between the longitudinal axis of the nacelle 116a, 116b and the depression 191a, 191b. In such embodiments, the second portion 183a, 183b may not include vanes but may include "blank" cascade portions, for example, flat plates, to "blank-off" flow and carry hoop loads in a low profile about the longitudinal axis of the nacelle 116a, 116b. Because the second portion 183a, 183b of the cascade structure may not allow for the passage of bypass air therethrough, in some embodiments, the nacelle 116a, 116b does not include a blocker door 184a, 184b disposed between the longitudinal axis of the nacelle and the depression 191a, 191b. In this way, a channel 195a, 195b is formed between the inlet of the nacelle and the partially blocked outlet to allow for the efflux of bypass air through the channels 195a, 195b of each nacelle 116a, 116b. That is to say, the channel 195a, 195b in combination with the absence of a blocker door 184a, 184b underneath the respective depression 191a, 191b can act to balance duct pressures within the nacelle 116a, 116b in the reverse thrust configuration. In some embodiments, the depressions 191a, 191b can extend to the outlets of the nacelles 116a, 116b.

While the above description has pointed out novel features of the invention as applied to various embodiments, the skilled person will understand that various omissions, substitutions, and changes in the form and details of the device or process illustrated may be made without departing from the scope of the invention. Therefore, the scope of the invention is defined by any presented claims rather than by the foregoing description. All variations coming within the meaning and range of equivalency of presented claims are embraced within their scope.

What is claimed is:

1. A nacelle having a longitudinal axis and being configured to be coupled by a pylon to an underside of a wing having a swept wing configuration, the wing having a leading edge, the nacelle comprising:
    a lip defining an inlet; and
    a first cowling disposed aft of the lip and at least partially inboard of the pylon, the first cowling having a non-undulating trailing edge and an outer surface including a critical surface region localized between the wing and an inboard side of an upper surface of the nacelle to define an inboard flow area between the nacelle and the underside of the wing, the outer surface including a depression isolated at least one of near or in the critical surface region thereof, the depression being recessed relative to an adjacent portion of the outer surface and extending forward of the leading edge of the wing to an outlet of the nacelle.

2. The nacelle of claim 1, wherein the depression includes a curvature having a slope that is at least partially directed toward a centerline of the nacelle.

3. The nacelle of claim 1, wherein a transverse distance between the outer surface of the first cowling and the longitudinal axis of the nacelle is greater than a transverse distance between the depression and the longitudinal axis.

4. A nacelle having a longitudinal axis and being configured to be coupled by a pylon to an underside of a wing, the nacelle and a leading edge of the wing defining a first flow area on an inboard side of the pylon and a second flow area on an outboard side of the pylon the second flow area being greater than the first flow area, the nacelle comprising:
- a lip defining an inlet; and
- a first cowling having an outer surface, the outer surface defining a contour extending forward of the leading edge of the wing to an outlet of the nacelle, the contour having only two points of inflection defining at least in part a single depression isolated at least one of near or in a critical surface region of the outer surface, and defining a portion of the first flow area and extending forward of the leading edge of the wing to an outlet of the nacelle, the critical surface region localized between the wing and the inboard side of the upper surface of the nacelle and the contour configured to reduce compression of fluid flow along the leading edge of the wing.

5. The nacelle of claim 4, wherein the depression has a concave shape.

6. The nacelle of claim 5, wherein the depression is disposed aft of the lip.

7. The nacelle of claim 4, wherein the outer surface comprises a first radius of curvature defined between the longitudinal axis and a portion of the outer surface that is disposed on an inboard side of the nacelle and a second radius of curvature defined between the longitudinal axis and a portion of the outer surface that is disposed on an outboard side of the nacelle, the first radius of curvature being less than the second radius of curvature.

8. The nacelle of claim 4 further comprising a second cowling disposed between the lip and the first cowling.

9. The nacelle of claim 8, wherein the first cowling is configured to translate along the longitudinal axis relative to the second cowling.

10. A nacelle having a longitudinal axis, comprising:
- a lip defining an inlet;
- a translating sleeve at least partially defining a non-undulating outlet and being configured to translate in a longitudinal direction relative to the lip between at least a first configuration and a second configuration, the translating sleeve having an surface which is configured to face an underside of a wing, the upper surface including a depression aft a forward pylon attachment point inboard of a pylon, the depression defined from forward of a leading edge of the wing to an outlet of the nacelle and disposed below the underside of the wing and configured to increase a flow area and reduce fluid compression on a portion of the leading edge of the wing inboard the pylon; and
- a cascade having at least a first portion disposed between the translating sleeve and the longitudinal axis when the translating sleeve is in the first configuration, the first portion of the cascade being exposed when the translating sleeve is in the second configuration.

11. The nacelle of claim 10, wherein the first portion of the cascade comprises a plurality of vanes.

12. The nacelle of claim 10, wherein a second portion of the cascade is disposed between the depression and the longitudinal axis when the translating sleeve is in the first configuration.

13. The nacelle of claim 12, wherein the second portion of the cascade does not comprise any vanes.

14. The nacelle of claim 10 further comprising a plurality of blocker doors configured to be activated to at least partially impinge an air pathway defined between the inlet and an outlet of the nacelle at least when the translating sleeve is in the second configuration.

15. The nacelle of claim 14, wherein the plurality of blocker doors at least partially define a channel extending between the inlet and the outlet of the nacelle when the blocker doors are activated, at least a portion of the channel being, disposed between the depression and the longitudinal axis of the nacelle.

* * * * *